(12) United States Patent
Desai

(10) Patent No.: US 7,988,224 B2
(45) Date of Patent: Aug. 2, 2011

(54) COWL COVER ASSEMBLY FOR A MOTOR VEHICLE

(76) Inventor: Vinod Desai, Royal Oak, MI (US)

( * ) Notice: Subject to any disclaimer, the term of this patent is extended or adjusted under 35 U.S.C. 154(b) by 0 days.

(21) Appl. No.: 12/646,020

(22) Filed: Dec. 23, 2009

(65) Prior Publication Data

US 2011/0148148 A1    Jun. 23, 2011

(51) Int. Cl.
*B62D 25/08* (2006.01)
*B62D 25/16* (2006.01)
(52) U.S. Cl. .................. 296/192; 296/198; 296/203.02
(58) Field of Classification Search .................. 296/192, 296/198, 203.01, 203.02, 193.09
See application file for complete search history.

(56) References Cited

U.S. PATENT DOCUMENTS

| 3,541,668 A | 11/1970 | Wessells II, et al. |
| 5,667,271 A * | 9/1997 | Booth ............................ 296/192 |
| 6,213,541 B1 * | 4/2001 | Razgunas et al. ............. 296/192 |
| 7,182,397 B1 * | 2/2007 | Desai ............................. 296/192 |
| 7,316,448 B2 | 1/2008 | Koyama et al. |
| 2003/0107243 A1 * | 6/2003 | Hayashi ......................... 296/192 |
| 2009/0261621 A1 | 10/2009 | Usuda |

FOREIGN PATENT DOCUMENTS

JP            05-178083        7/1993

* cited by examiner

*Primary Examiner* — Dennis H Pedder

(57) ABSTRACT

A cowl cover assembly for a vehicle includes a first fender and a cowl cover having a first lateral end and a second lateral end. A first coupling structure disposed on the first lateral end of the cowl cover. The first coupling structure has a groove that is engageable with the first fender for rigidly connecting the cowl cover to the first fender.

16 Claims, 5 Drawing Sheets

COWL COVER ASSEMBLY FOR A MOTOR VEHICLE

FIELD OF THE INVENTION

The present invention relates to the field of exterior trim panels for motor vehicles, and more particularly, to a cowl cover assembly for a motor vehicle.

BACKGROUND

In many motor vehicles, the interface between the vehicle body and a lower terminal edge of the windshield is disposed adjacent to, but outside of, the engine compartment of the vehicle. To provide a finished appearance for this joint, it is known to mount a cowl cover to the vehicle body in this area, such that the cowl cover extends over the lower terminal edge of the windshield and extends under a hood of the vehicle. The cowl cover further serves to provide mounting locations for equipment such as windshield wipers and windshield washer nozzles, as well as to conceal portions of these assemblies.

The design of certain vehicles is such that a significant elevation change is present between a top surface of a fender of the vehicle and a lateral edge of the windshield in the area adjacent to a lateral end of the cowl cover. To provide a finished appearance for this joint, it is known to provide fender covers on each end of the cowl cover, extending over a portion of the lateral edge of the windshield and engaging the fender.

Typically, the cowl cover is fabricated from a substantially rigid plastic material, while the fender covers are fabricated from a soft plastic material such as rubber. The fender covers are typically fabricated separately from the cowl cover. However, it is known to fabricate the cowl cover and the fender covers as an integral unit, using a two-shot molding process to accommodate use of the different materials for the cowl cover and the fender covers.

It would be desirable to provide a cowl cover of reduced complexity and cost that can be easily assembled with respect to the body of the vehicle.

SUMMARY OF THE INVENTION

A cowl cover assembly for a vehicle is taught herein. The cowl cover assembly includes a fender and a cowl cover having a first lateral end and a second lateral end. A first coupling structure disposed on the first lateral end of the cowl cover. The first coupling structure has a groove that is engageable with the first fender for rigidly connecting the cowl cover to the first fender.

The groove may be defined by a pair of opposed walls, where the first fender is received between the opposed walls of the groove to rigidly connect the cowl cover to the first fender. Furthermore, the groove may be defined by a first wall and a second wall that is opposite the first wall and in a facing relation with respect thereto, wherein a base wall interconnects the first wall and the second wall. In such a structure, the first wall and the second wall may be substantially parallel.

The groove of the first coupling structure may be formed in a top surface of the cowl cover. Furthermore, the first fender may include a flange that is received within the groove of the first coupling structure of the cowl cover. In addition, the flange of the first fender may extend downward into the groove of the first coupling structure of the cowl cover. Furthermore, the groove may be the only means by which the cowl cover is connected to the first fender.

The first coupling structure may be formed integrally on the cowl cover.

The first coupling structure may include a shoulder that extends upward from a top surface of the cowl cover adjacent to the first coupling structure. Furthermore, the first coupling structure may have a ramp surface that is formed adjacent to the groove of the first coupling structure for guiding a portion of the first fender into engagement with the groove of the first coupling structure during installation of the cowl cover, wherein a top surface of the shoulder extends higher than a top surface of the ramp surface. Furthermore, the first fender may include a fender flange that is received within the groove of the first coupling structure of the cowl cover and an upper terminal edge of the fender flange of the first fender may extend higher than a top surface of the shoulder.

The first coupling structure may have a ramp surface that extends upward from a top surface of the cowl cover adjacent to the groove of the first coupling structure for guiding a portion of the first fender into engagement with the groove of the first coupling structure during installation.

The cowl cover assembly may include a windshield having a front edge and a lateral edge, wherein the cowl cover overlies at least a portion of the front edge of the windshield and at least a portion of the lateral edge of the windshield.

The cowl cover may include a first body portion that extends from a first intermediate end to the first lateral end of the cowl cover and a second body portion that extends from a second intermediate end to the second lateral end of the cowl cover. Furthermore, the second intermediate end of the second body portion of the cowl cover may overlap the first intermediate end of the first body portion of the cowl cover at a dividing line between the first body portion of the cowl cover and the second body portion of the cowl cover to accommodate lateral tolerance variations.

The cowl cover assembly may include an engine compartment, wherein the first coupling structure is disposed adjacent to the engine compartment.

The cowl cover assembly may include a second fender and a second coupling structure that is disposed on the second lateral end of the cowl cover. The second coupling structure has a groove that is engageable with the second fender for rigidly connecting the cowl cover to the second fender.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
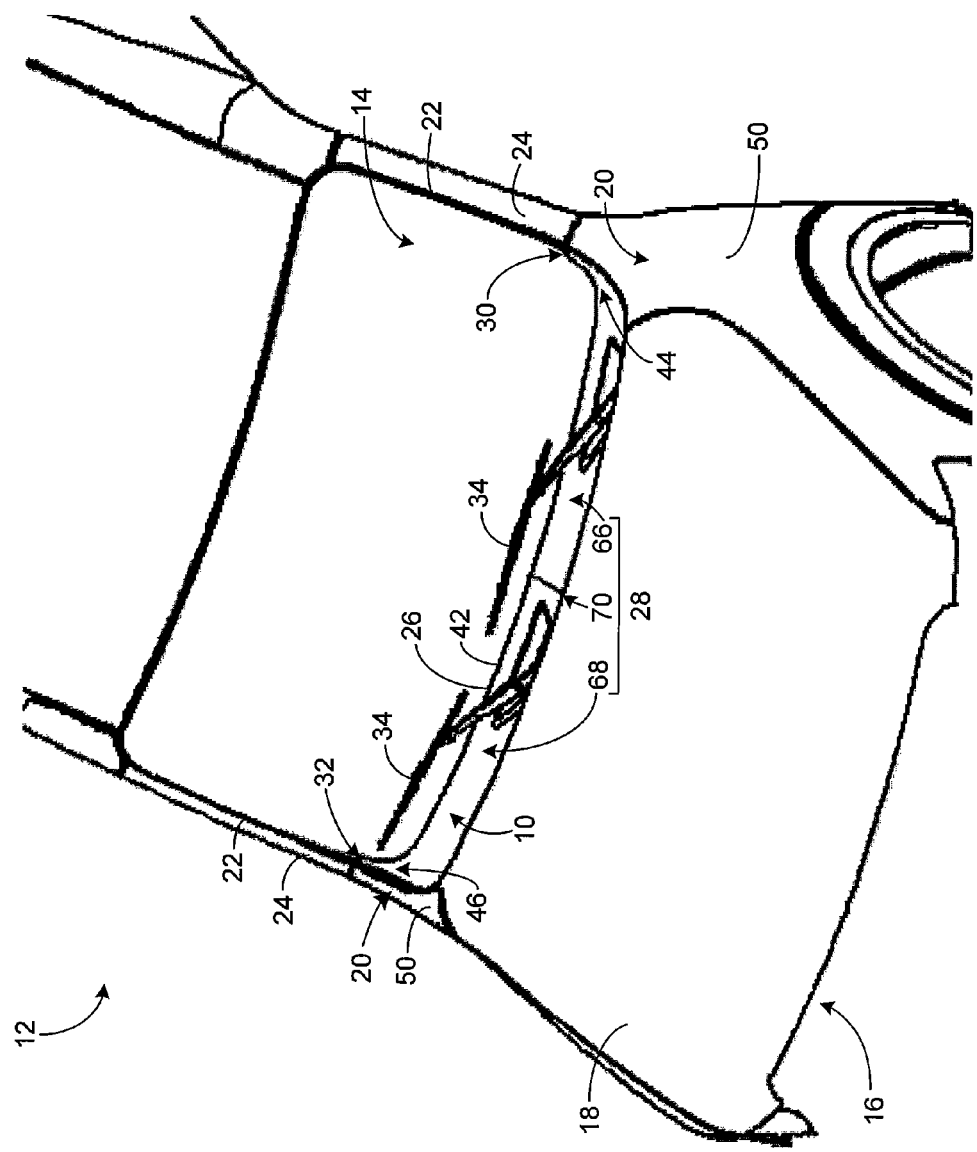
FIG. 1 is a perspective view showing a cowl cover according to the present invention installed on a vehicle.

FIG. 1 shows a cowl cover 10 according to the invention installed on a vehicle 12. The vehicle 12 includes a windshield 14, an engine compartment 16 disposed longitudinally forward of and adjacent to the windshield 14, a hood 18 that overlies the engine compartment 16, and a pair of fenders 20 that are disposed on opposite lateral sides of the engine compartment 16 and the hood 18. The windshield 14 includes a pair of lateral edges 22 that are each adjacent to a respective one of the fenders 20, as well as a respective A pillar 24 of the vehicle 12, as well as a front edge 26 that is adjacent to the engine compartment 16. The fenders 20 are typically thin-walled body panels having a finished exterior surface 50, an interior surface 48 (FIG. 5) opposite the exterior surface 50, and a fender flange 52 (FIG. 5) that is adjacent to the engine compartment 16.

The cowl cover 10 provides a finished appearance for the vehicle 12 along the front edge 26 of the windshield 14, as well as along the lateral edges 22 of the windshield 14 in the area adjacent to each of the fenders 20. The cowl cover 10 includes a body portion 28 that extends from a first lateral end 30 to a second lateral end 32, wherein the first lateral end 30 and the second lateral end 32 of the cowl cover 28 are each adjacent to one of the fenders 20. The cowl cover 10 is rigidly connected to one or both of the fenders 20, for example, by rigid connection of the first lateral end 30 and the second lateral end 32 the cowl cover 10 to the fender flange 52 of a respective one of the fenders 20. As will be explained further herein, the cowl cover 10 is also configured to allow functional components, such as a pair of windshield wipers 34, to be mounted with respect to the vehicle 12.

Figure 2:
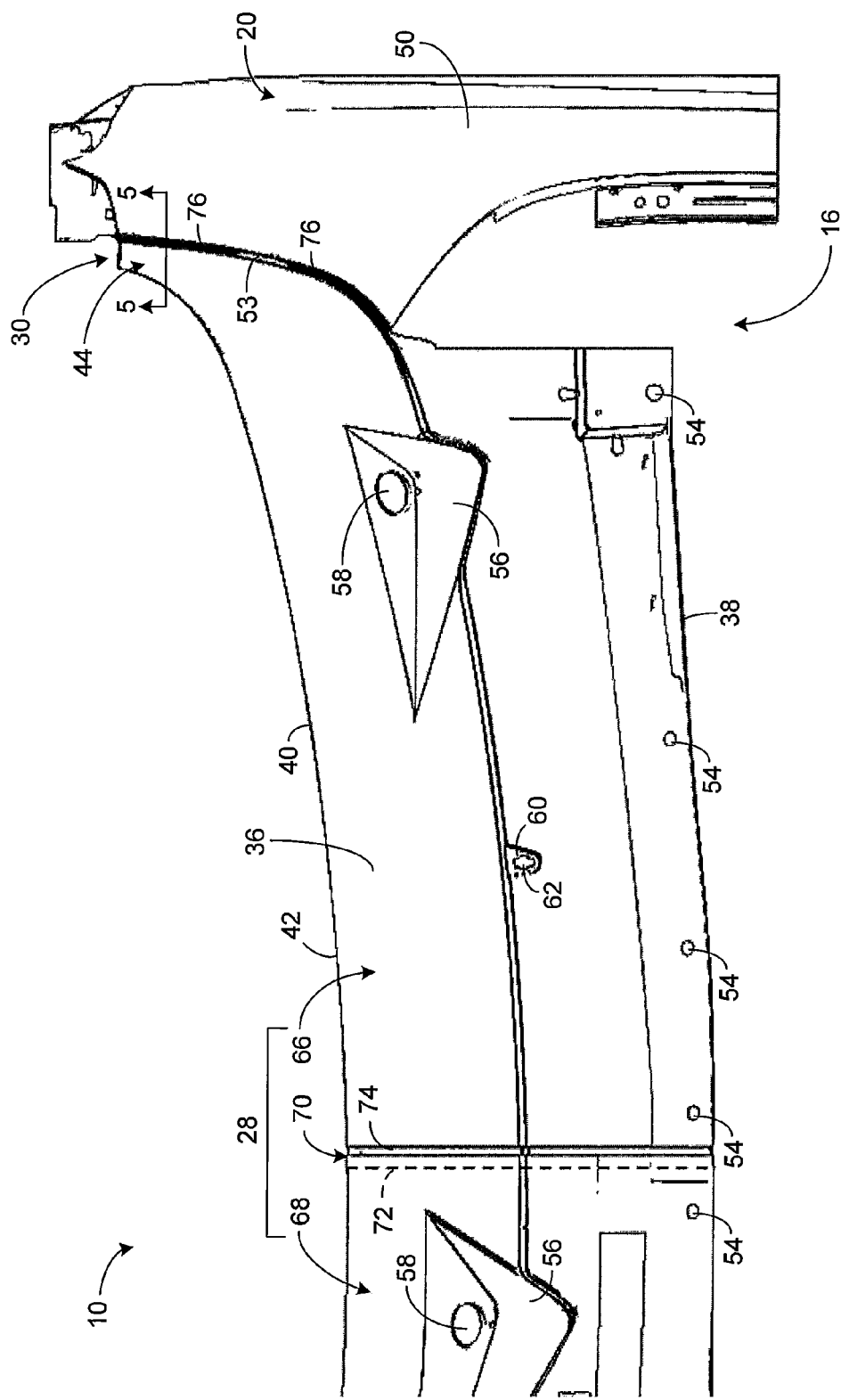
FIG. 2 is a top view showing the cowl cover according to the present invention installed on the vehicle.

As shown in FIG. 2, the cowl cover 10 is positioned adjacent to the engine compartment 16 and the fender 20 of the vehicle 12. In particular, the cowl cover 10 has a top surface 36 that is visible when the cowl cover 10 is installed on the vehicle 12, wherein the top surface 36 extends between a leading edge 38 that is adjacent to the engine compartment 16 and a trailing edge 40 that is opposite the engine compartment 16. A lip 42 may be formed at the trailing edge 40 of the cowl cover 10 which overlies the front edge 26 of the windshield 14.

The cowl cover 10 includes a first coupling structure 44 and a second coupling structure 46 that are similar to one another and are located at the first lateral end 30 and the second lateral end 32 of the cowl cover 10, respectively. The first coupling structure 44 and the second coupling structure 46 are fabricated from a single, substantially rigid material, and are formed integrally on the body portion 28 of the cowl cover 10. Furthermore, the substantially rigid material can be a substantially rigid plastic material. Additionally, as used herein, "integrally" means permanently fixedly attached, such as by a single shot molding operation or by welding.

The first coupling structure 44 is formed on the first lateral end 30 of the cowl cover 10 in the area where the cowl cover 10 abuts one of the fenders 20 of the vehicle 12. In particular, the first coupling structure 44 is adjacent to a fender flange 52 of the fender 20. Furthermore, the first coupling structure 44 directly abuts the fender flange 52 of the fender 20, wherein the fender flange 52 and the first coupling structure 44 are rigidly connected to one another, as will be described herein. Similarly, the second coupling structure 46 is formed on the second lateral end 32 of the cowl cover 10 and is rigidly connected to the fender flange 52 of the other one of the fenders 20 of the vehicle 12.

The first coupling structure 44 and the second coupling structure 46 may be elongate structures that extend substantially continuously along the areas in which the cowl cover 10 abuts each of the fenders 20. It should be noted, however, that either of both of the first coupling structure 44 and the second coupling structure 46 could be interrupted, for example, by an extension 53 of the fender flange 52 of a respective one of the fenders 20, wherein the extension 53 extends downward from the fender flange 52 to provide a structural interconnection of the fender 20 with other portions of the vehicle 12.

In order to connect the cowl cover 10 to the vehicle 12, a plurality of fastening structures 54 are provided on the body portion 28 of the cowl cover 10 adjacent to the leading edge 38 and the trailing edge 40 thereof. The fastening structures 54 may include, but are not limited to, integrally-formed posts or clips, or apertures for use with separately-formed clips (not shown). However, it should be noted that the cowl cover 10 is directly connected to the fenders 20 solely by the first coupling structure 44 and the second coupling structure 46. In this regard, the first coupling structure 44 and the second coupling structure 46 can be formed such that separately provided clips or other fasteners are not needed to rigidly connect the cowl cover 10 to the fenders 20. Thus, the first coupling structure 44 and the second coupling structure 46 may be the only means by which the cowl cover 10 is connected to the fenders 20 of the vehicle 12.

To accommodate functional components of the vehicle, such as the windshield wipers 34 and windshield washer assemblies (not shown), corresponding structures can be formed on the body portion 28 of the cowl cover 10, including wiper pockets 56 and wiper holes 58 for accommodating the windshield wipers 34, as well as nozzle pockets 60 and nozzle holes 62 for accommodating the windshield washer assemblies. Additionally, an array of apertures 64 (FIG. 3) can be formed through the cowl cover 10 for use by the HVAC system (not shown) of the vehicle 12.

Figure 3A:
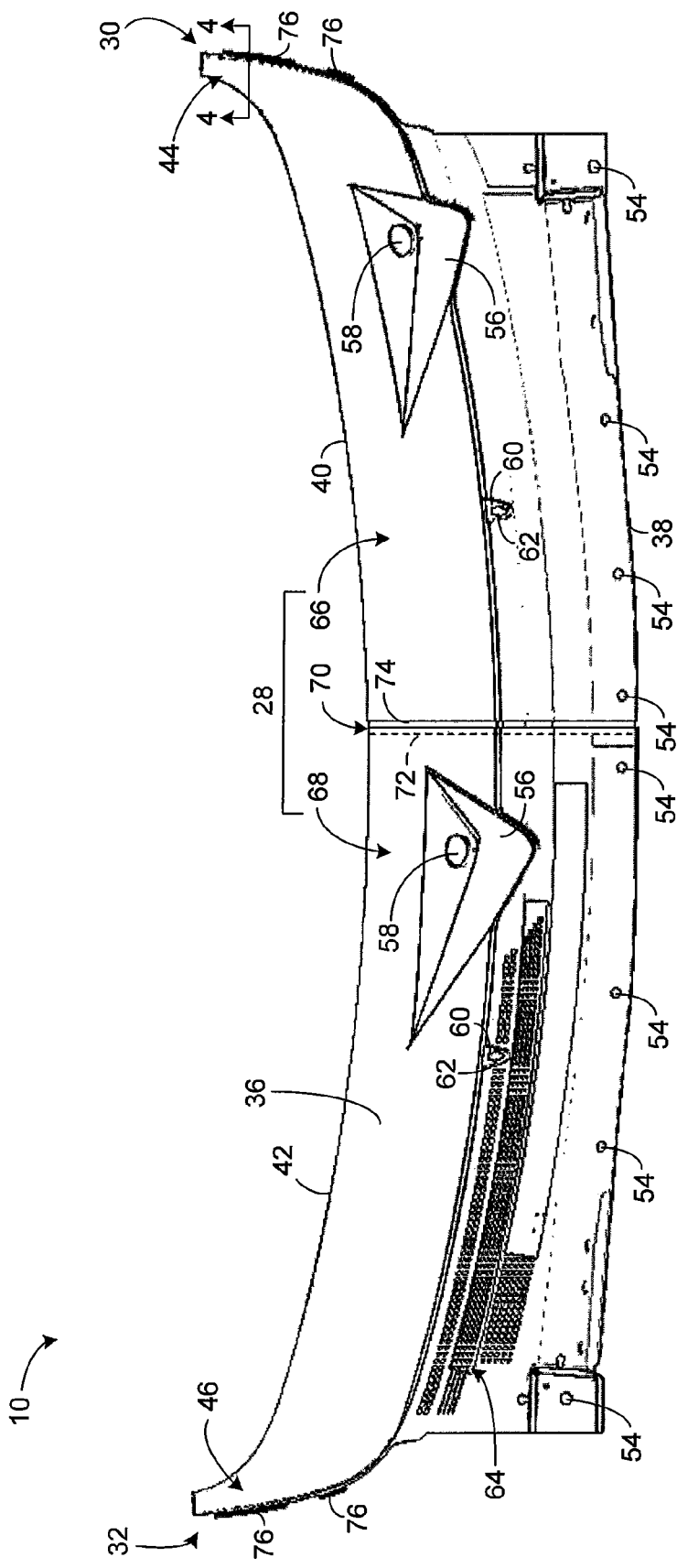
FIG. 3A is a top view of the cowl cover according to the present invention.

As best seen in FIG. 3A, the cowl cover 10 can be formed as a two-part structure having a first body portion 66 and a second body portion 68 that meet at a dividing line 70 at a location that is intermediate the first lateral end 30 and the second lateral end 32 of the cowl cover 10. The first body portion 66 and the second body portion 68 are separate structures that may be detached completely from one another.

The first body portion 66 of the cowl cover 10 extends from a first intermediate end 72 of the first body portion 66 to the first lateral end 30 of the cowl cover 10. Similarly, the second body portion 68 of the cowl cover 10 extends from a second intermediate end 74 of the second body portion 68 to the second lateral end 32 of the cowl cover 10. The first coupling structure 44 and the first body portion 66 are formed integrally from a single, substantially rigid material. Likewise, the second coupling structure 46 and the second body portion 68 are formed integrally from a single, substantially rigid material.

In order to accommodate lateral tolerance variations during installation of the cowl cover 10 on a vehicle 12, the first body portion 66 and the second body portion 68 may overlap one another. In particular, the second intermediate end 74 of the second body portion 68 of the cowl cover 10 may overlap the first intermediate end 72 of the first body portion 66 of the cowl cover 10 at the dividing line 70.

Figure 3B:
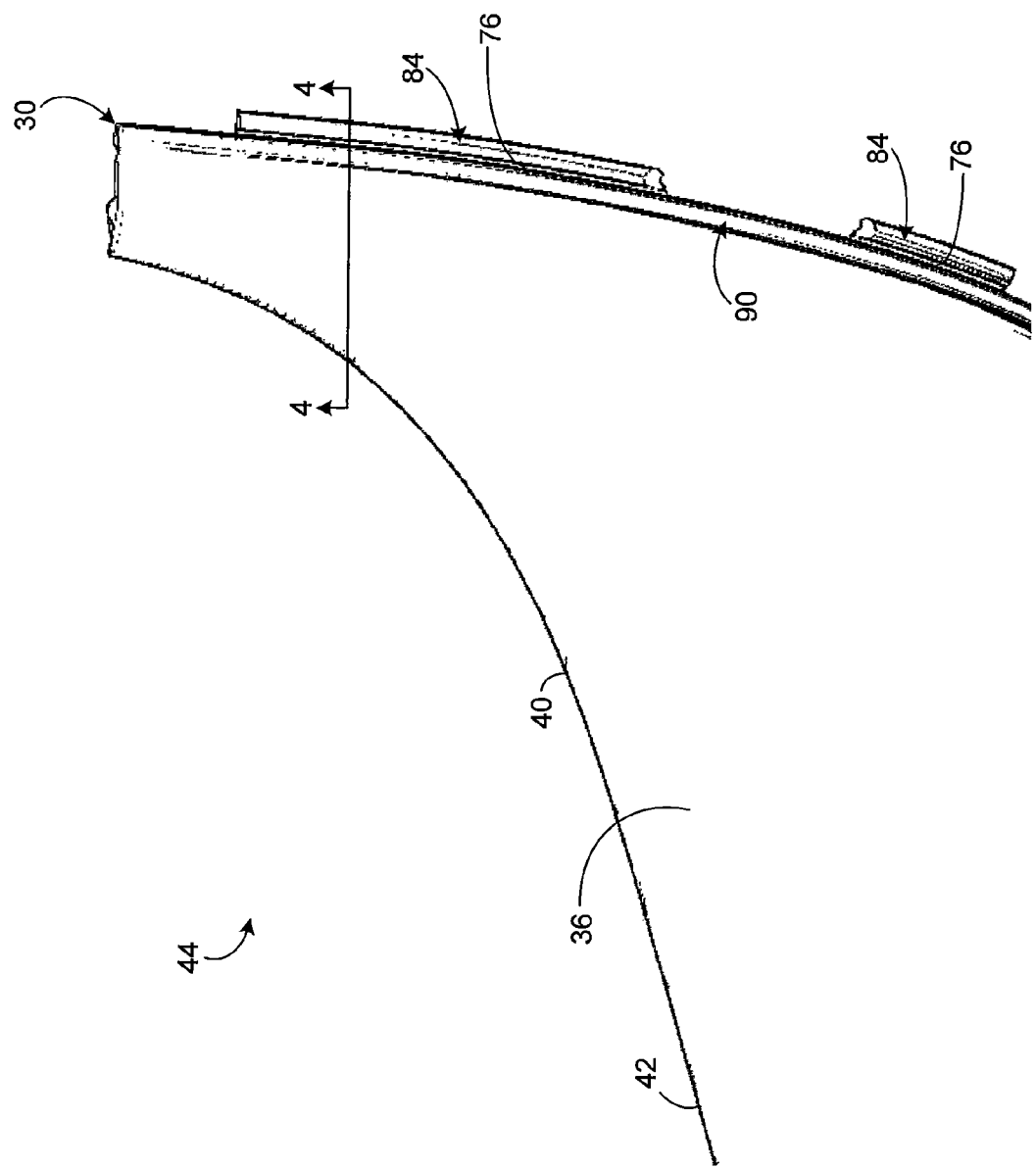
FIG. 3B is a top view of a first coupling structure of the cowl cover.

The first coupling structure 44 and the second coupling structure 46 will now be explained in detail with reference to the first coupling structure 44 as representative of both the first and second coupling structures 44, 46. In particular, the first coupling structure 44 and the second coupling structure 46 can include a groove 76, a guide ramp 84 and a shoulder 90, which are formed at the first lateral end 30 of the first body portion 66 of the cowl cover 10, as shown in FIG. 3B. Accordingly, the second coupling structure 46 includes equivalent elements, which are located at the second lateral end 32 of the second body portion 68 of the cowl cover 10.

Figure 4:
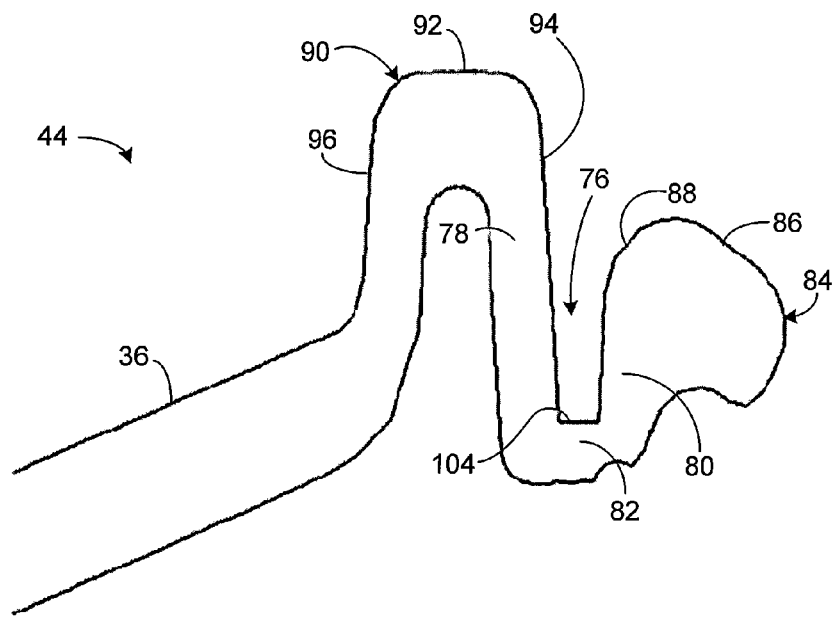
FIG. 4 is a cross-sectional view of the first coupling structure of the cowl cover taken at line 4-4 of FIGS. 3A and 3B.

As best seen in FIG. 4, the groove 76 of the first coupling structure 44 is defined by a pair of opposed walls, namely a first wall 78 and a second wall 80. The second wall 80 is opposite the first wall 78 and is in a facing relation with respect thereto. A base wall 82 is provided at the bottom of the groove 76, and the base wall 82 interconnects the first wall 78 and the second wall 80. The first wall 78 and the second wall 80 may be substantially parallel to one another, such that the walls 78, 80 are exactly parallel to one another or such that the walls 78, 80 both form a slight, substantially obtuse angle with respect to the bottom wall 82, causing the first wall 78 and the second wall 80 to define a slightly-opening tapered profile for the groove 76, wherein the tapered profile opens as it extends upward from the base wall 82.

A guide ramp 84 may be formed as a portion of the first coupling structure 44, adjacent to the groove 76. The guide ramp 84 includes a top surface 86 that may be substantially arcuate. The guide ramp 84 also includes a ramp surface 88 that is defined in part by the second wall 80 and provides a curve or taper from the top surface 86 of the guide ramp 84 toward the base wall 82 of the groove 76, such that the ramp surface 88 is operable to guide the fender flange 52 of the fender 20 into the groove 76 during installation of the cowl cover 10 with respect to the vehicle 12. Typically, the interior surface 48 of the fender 20 faces the guide ramp 84, including the ramp surface 88, subsequent to installation of the cowl cover 10 with respect to the vehicle.

Opposite the guide ramp 84, a shoulder 90 is formed adjacent to the groove 76. The shoulder 90 includes a top surface 92 that is disposed higher than the top surface 86 of the guide ramp 84, but lower than an upper terminal edge 99 (FIG. 5) of the fender flange 52, when the cowl cover 10 is assembled with respect to the vehicle 10. A fender-facing surface 94 extends downward from the top surface 92 of the shoulder 90 toward the groove 76 and is defined at least in part by the first wall 78. The fender-facing surface 94 is in facing relationship with at least a portion of the fender 20, such as the fender flange 52, and typically faces the finished exterior surface 50 of the fender 20. Opposite the fender-facing surface 94, a cowl-facing surface 96 is formed on the shoulder 90 and extends downward from the top surface 92, and a nominal profile of the top surface 36 of the body 28 of the cowl cover 10 resumes at a lower terminal end of the cowl-facing surface 96.

Figure 5:
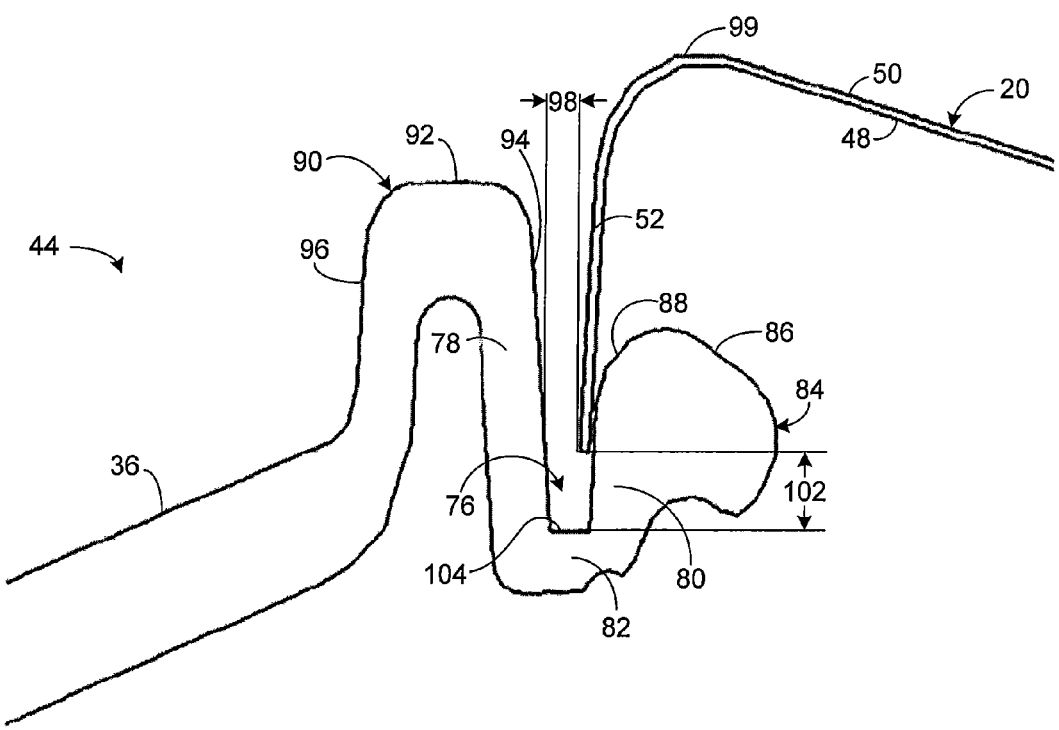
FIG. 5 is a cross-sectional view of the coupling structure of the cowl cover and a fender of the vehicle taken at line 5-5 of FIG. 2.

As shown in FIG. 5, the fender flange 52 of the fender 20 is received within the groove 76 of the first coupling structure 44 of the cowl cover 10. Along the fender flange 52, the exterior surface 50 of the fender 20 faces the first wall 78 of the first coupling structure 44 and the interior surface 48 of the fender 20 faces the second wall 80 of the first coupling structure 44 to restrict movement of the cowl cover 10 in a lateral direction with respect to the vehicle 12. In particular, the fender flange 52 of the fender 20 is typically in engagement with the second wall 80 of the first coupling structure 44 and is spaced from the first wall 78 of the first coupling structure 44 by a first distance 98. A lower terminal edge 99 of the fender flange 52 of the fender 20 may be spaced from a top surface 104 of the base wall 82 of the groove 76 by a second distance 102. The first distance 98 and the second distance 102 allow for lateral and vertical tolerance variations when positioning the cowl cover 10 for attachment to the vehicle 12 via fastening structures 54 during installation. Further lateral tolerance variations caused during installation or by thermal expansion during operation of the vehicle 12 can be absorbed by the overlap of the second intermediate end 74 of the second body portion 68 of the cowl cover 10 with the first intermediate end 72 of the first body portion 66 of the cowl cover 10.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A cowl cover assembly for a vehicle, comprising:
   a first fender;
   a cowl cover having a first lateral end and a second lateral end; and
   a first coupling structure disposed on the first lateral end of the cowl cover, the first coupling structure having a groove that is engageable with the first fender for rigidly connecting the cowl cover to the first fender, wherein the first fender includes a flange that is received within the groove of the first coupling structure of the cowl cover and the flange of the first fender extends downward into the groove of the first coupling structure of the cowl cover.

2. The cowl cover assembly of claim 1, wherein the groove is defined by a pair of opposed walls, and a portion of the first fender is received between the opposed walls of the groove to rigidly connect the cowl cover to the first fender.

3. The cowl cover assembly of claim 1, further comprising:
   the groove defined by a first wall, a second wall that is opposite the first wall and in a facing relation with respect thereto, and a base wall that interconnects the first wall and the second wall.

4. The cowl cover assembly of claim 3, wherein the first wall and the second wall are substantially parallel.

5. The cowl cover assembly of claim 1, wherein the groove is formed in a top surface of the cowl cover.

6. The cowl cover assembly of claim 1, wherein the groove is the only means by which the cowl cover is connected to the first fender.

7. The cowl cover assembly of claim 1, wherein the first coupling structure is formed integrally on the cowl cover.

8. The cowl cover assembly of claim 1, further comprising:
   the cowl cover having a shoulder that extends upward from a top surface of the cowl cover adjacent to the groove of the first coupling structure.

9. The cowl cover assembly of claim 8, further comprising:
   the first coupling structure having a ramp surface that is formed adjacent to the groove of the first coupling structure opposite the shoulder for guiding a portion of the first fender into engagement with the groove of the first coupling structure during installation of the cowl cover, wherein a top surface of the shoulder extends higher than a top surface of the ramp surface.

10. The cowl cover assembly of claim 8, wherein an upper terminal edge of the fender flange of the first fender extends higher than a top surface of the shoulder.

11. A cowl cover assembly for a vehicle, comprising:
    a first fender;
    a cowl cover having a first lateral end and a second lateral end; and
    a first coupling structure disposed on the first lateral end of the cowl cover, the first coupling structure having a groove that is engageable with the first fender for rigidly connecting the cowl cover to the first fender, and the first coupling structure having a ramp surface that extends upward from a top surface of the cowl cover adjacent to the groove of the first coupling structure for guiding a portion of the first fender into engagement with the groove of the first coupling structure during installation of the cowl cover.

12. The cowl cover assembly of claim 1, further comprising:
a windshield having a front edge and a lateral edge wherein the cowl cover overlies at least a portion of the front edge of the windshield and at least a portion of the lateral edge of the windshield.

13. The cowl cover assembly of claim 1, wherein the cowl cover includes a first body portion that extends from a first intermediate end to the first lateral end of the cowl cover and a second body portion that extends from a second intermediate end to the second lateral end of the cowl cover.

14. The cowl cover assembly of claim 13, wherein the first intermediate end of the first body portion of the cowl cover overlaps the second intermediate end of the second body portion of the cowl cover at a dividing line between the first body portion of the cowl cover and the second body portion of the cowl cover to accommodate lateral tolerance variations.

15. The cowl cover assembly of claim 1, further comprising:
an engine compartment, wherein the first coupling structure is disposed adjacent to the engine compartment.

16. The cowl cover assembly of claim 1, further comprising:
a second fender; and
a second coupling structure disposed on the second lateral end of the cowl cover, the second coupling structure having a groove that is engageable with the second fender for rigidly connecting the cowl cover to the second fender.

* * * * *